(12) United States Patent
Ohno et al.

(10) Patent No.: US 7,311,750 B2
(45) Date of Patent: Dec. 25, 2007

(54) FILTER, METHOD OF MANUFACTURING THE SAME, AND EXHAUST GAS PURIFICATION DEVICE

(75) Inventors: Kazushige Ohno, Gifu (JP); Kazutake Ogyu, Gifu (JP); Masayuki Hayashi, Gifu (JP)

(73) Assignee: Ibeden Co., Ltd., Gifu (JP)

( * ) Notice: Subject to any disclaimer, the term of this patent is extended or adjusted under 35 U.S.C. 154(b) by 42 days.

(21) Appl. No.: 11/335,695

(22) Filed: Jan. 20, 2006

(65) Prior Publication Data

US 2006/0179803 A1 Aug. 17, 2006

Related U.S. Application Data

(63) Continuation of application No. PCT/JP2005/012144, filed on Jun. 24, 2005.

(30) Foreign Application Priority Data

Jun. 25, 2004 (JP) .............................. 2004-188857

(51) Int. Cl.
*B01D 46/00* (2006.01)
*F01N 3/021* (2006.01)

(52) U.S. Cl. ...................... 55/523; 55/282.2; 55/282.3; 55/385.3; 55/524; 55/DIG. 5; 55/DIG. 10; 55/DIG. 30; 60/297; 60/311; 264/628; 264/630; 264/DIG. 48; 427/215

(58) Field of Classification Search ............... 55/282.2, 55/282.3, 385.3, 523, 524, DIG. 5, DIG. 10, 55/DIG. 30; 60/295, 297, 299, 311; 264/629, 264/630, 628, 638, 682, DIG. 48; 427/180, 427/215
See application file for complete search history.

(56) References Cited

U.S. PATENT DOCUMENTS 5,238,478 A * 8/1993 Zievers et al. ................. 55/523
5,456,740 A * 10/1995 Snow et al. ................... 55/523

(Continued)

FOREIGN PATENT DOCUMENTS

JP 2000-218165 8/2000

(Continued)

OTHER PUBLICATIONS

U.S. Appl. No. 11/289,611.

(Continued)

*Primary Examiner*—Jason M. Greene
(74) *Attorney, Agent, or Firm*—Finnegan Henderson Farabow Garrett & Dunner LLP

(57) ABSTRACT

Ceramic particles, fine particles having smaller average particle diameter smaller than that of the ceramic particles and a reduction-resistant material are mixed to obtain a puddle. The reduction-resistant material is a material that is reduced by carbon at a higher temperature as compared with a temperature at which an oxide (for example, silica) of an element contained in the ceramic particles is reduced. The average particle diameter of the ceramic particles is preferably about in a range of 5 to 100 μm and the average particle diameter of the fine particles is preferably about in a range of 0.1 to 10 μm. The reduction-resistant material is, for example, alumina. This puddle is extrusion molded into a honeycomb filter and the molded object is sintered at about 1600 to 2200° C.

23 Claims, 7 Drawing Sheets

U.S. PATENT DOCUMENTS

| | | | |
|---|---|---|---|
| 6,837,911 B2* | 1/2005 | Noda et al. | 55/282.3 |
| 6,840,976 B2* | 1/2005 | Vance et al. | 55/523 |
| 2005/0102987 A1 | 5/2005 | Kudo | |
| 2006/0135343 A1 | 6/2006 | Ohno et al. | |
| 2006/0179803 A1 | 8/2006 | Ohno et al. | |

FOREIGN PATENT DOCUMENTS

| | | |
|---|---|---|
| JP | 2003-265964 | 9/2003 |
| WO | WO 00/01463 * | 1/2000 |

OTHER PUBLICATIONS

U.S. Appl. No. 11/335,695.
Not assigned (Con of PCT/JP2005/0).
U.S. Appl. No. 11/712,410, unpublished.
English Translation—PCT International Preliminary Report on Patentability re PCT/JP2005/012144, 2006.
Related case list, no date.

* cited by examiner (a)

(b)

(a)

(b)

FILTER, METHOD OF MANUFACTURING THE SAME, AND EXHAUST GAS PURIFICATION DEVICE

CROSS-REFERENCE TO RELATED APPLICATIONS

This application is a continuation application of International Application No. PCT/JP2005/012144, filed on Jun. 24, 2005.

BACKGROUND ART

1. Field of the Invention

The present invention relates to a filter, a method of manufacturing the same and an exhaust gas purification device.

2. Description of the Prior Art

Hitherto, as a honeycomb filter for removing particulate materials contained in exhaust gas, a honeycomb filter having a silica deposit formed on the surface of silicon carbide that is an aggregate has been proposed. For example, JP-A 2000-218165 describes a honeycomb filter in which a molded product having a filter shape is sintered under an inert atmosphere, followed by preliminary firing in the presence of oxygen to form a silica deposit on the surface of silicon carbide for improving the strength. The contents of JP-A 2000-218165 are incorporated herein by reference in their entirety.

SUMMARY OF THE INVENTION

The present invention is directed to a filter for removing particulate materials contained in exhaust gas. The filter of the invention includes: ceramic particles as an aggregate; and a ceramic particles protective material that is present on a surface of the ceramic particles and composed of a reduction-resistant material or a precursor thereof being reduced by carbon contained in the particulate materials at a higher temperature than a temperature at which an oxide of an element contained in the ceramic particles is reduced.

In the filter of the invention, the ceramic particles are preferably silicon carbide.

In the filter of the invention, the ceramic particles protective material is preferably present as a protective deposit on a surface of the ceramic particles. In this case, a thickness of the protective deposit is preferably about in a range of 0.4 to 1000 nm.

In the filter of the invention, the reduction-resistant material preferably includes one or more materials selected from the group consisting of aluminum oxide, mullite, yttrium oxide, magnesium oxide, lithium oxide, calcium oxide and titanium oxide.

The present invention is also directed to a method of manufacturing a filter for removing particulate materials contained in exhaust gas, including: a raw material mixing step that mixes ceramic particles having a predetermined average particle diameter, and fine particles that are the same material as the ceramic particles and have an average particle diameter being smaller than the predetermined average particle diameter to form a puddle; and a molding and firing step that molds the puddle to obtain a molded object and fires the molded object in a coexistence with a reduction-resistant material or a precursor thereof that is reduced by carbon contained in the particulate materials at a higher temperature than a temperature at which an oxide of an element contained in the ceramic particles is reduced, thereby sintering the molded object and allowing the ceramic particles protective material composed of the reduction-resistant material or the precursor thereof to exist on a surface of the ceramic particles.

The present invention is directed to a second method of manufacturing a filter for removing particulate materials contained in exhaust gas, including: a raw material mixing step that mixes ceramic particles having a predetermined average particle diameter, fine particles that are the same material as the ceramic particles and have an average particle diameter being smaller than the predetermined average particle diameter, and a reduction-resistant material or a precursor thereof that is reduced by carbon contained in the particulate materials at a higher temperature than a temperature at which an oxide of an element contained in the ceramic particles is reduced to form a puddle; and a molding and firing step that molds the puddle to obtain a molded object and fires the molded object, thereby sintering the molded object and allowing the ceramic particles protective material composed of the reduction-resistant material or the precursor thereof to exist on a surface of the ceramic particles. In this method of the invention, the molding and firing step fires the molded object preferably in a coexistence with the molded object and the reduction-resistant material or the precursor thereof, so as to allow the ceramic particles protective materials to exist on a surface of the molded object also by the reduction-resistant material or the precursor thereof.

In either method of manufacturing a filter of the invention described above, the ceramic particles are preferably silicon carbide. In this case, the raw material mixing step preferably further mixes metal silicon to form a puddle. In case where metal silicon is mixed, the molding and firing step, a temperature for firing the molded object is preferably about in a range of 1100 to 1800° C. in the molding and firing step.

In either method of manufacturing a filter of the invention described above, a temperature for firing the molded object is preferably about in a range of 1600 to 2200° C.

In either method of manufacturing a filter of the invention described above, the predetermined average particle diameter is preferably about in a range of 5 to 100 μm.

In either method of manufacturing a filter of the invention described above, the average particle diameter of the fine particles is preferably about in a range of 0.1 to 10 μm.

In either method of manufacturing a filter of the invention described above, the reduction-resistant material preferably includes one or more materials selected from the group consisting of aluminum oxide, mullite, yttrium oxide, magnesium oxide, lithium oxide, calcium oxide and titanium oxide.

The present invention is further directed to an exhaust gas purification device for removing particulate materials contained in exhaust gas from an internal combustion engine. The exhaust gas purification device includes: a connecting pipe connected to the internal combustion engine and through which exhaust gas from the internal combustion engine flows; and a filter housing connected to the connecting pipe and accommodating the filter of the invention described above.

DETAILED DESCRIPTION OF THE INVENTION

The present invention is directed to a filter that removes particulate materials contained in exhaust gas and includes ceramic particles as an aggregate, and a ceramic particles protective material that is present on a surface of the ceramic particles and composed of a reduction-resistant material or a precursor thereof being reduced by carbon contained in the particulate materials at a higher temperature than a temperature at which an oxide of an element contained in the ceramic particles is reduced.

According to this filter, since a ceramic particles protective material composed of a reduction-resistant material or precursor thereof is present on the surface of ceramic particles, the protective effect with respect to the ceramic particles can be maintained up to quite a high temperature. That is to say, the ceramic particles protective material is not reduced at a lower temperature than a temperature at which oxide of an element contained in the ceramic particles is reduced. Therefore, the present invention can protect the ceramic particles at a higher temperature as compared with the case where oxide of the element contained in the ceramic particles is used as a ceramic particles protective material, and thus the thermal resistance of the filter can be enhanced.

In the filter of the present invention, it is preferable that the ceramic particles are, for example, any one or combination of silicon carbide particles, silicon nitride particles, silica particles, alumina particles, zirconia particles, titania particles, ceria particles and mullite particles. Among them, silicon carbide is more preferable. Silicon carbide is often used for a filter. Since silicon carbide reacts with oxygen to be oxidized under an oxygen atmosphere at a high temperature, the surface thereof needs to be formed of a protective material that is stable even at a high temperature. Therefore, it is significant that the present invention is applied to a case where silicon carbide is used as the ceramic particles.

In the filter of the present invention, the ceramic particles protective material may be present on the surface of the ceramic particles as a protective deposit. Thus, since the ceramic particles protective material covers the surface of the ceramic particles, the thermal resistance of the filter can be easily enhanced. In this case, the thickness of the protective deposit is preferably about in a range of 0.4 to 1000 nm, more preferably about in a range of 0.5 to 5 nm, and most preferably about in a range of 0.6 to 1.5 nm. It is thought that the thickness of the protective deposit of about 0.4 nm or more is preferable because the protective deposit adequately protects ceramic particles and that the thickness of protective deposit of about 1000 nm or less is preferable because the pressure loss of exhaust gas flowing through the filter is not excessively increased. The term "thickness of a protective deposit" in this specification denotes a value calculated by Auger electron spectroscopy (AES).

In the filter of the present invention, it is preferable that the reduction-resistant material includes one or more materials selected from the group consisting of aluminum oxide, mullite, yttrium oxide, magnesium oxide, lithium oxide, calcium oxide and titanium oxide. These materials are not relatively reducible even at a high temperature. Among these materials, aluminum oxide (alumina) is more preferable. Alumina is stable to heat and not easily reduced at a high temperature. Herein, the above-mentioned "precursor of a reduction-resistant material" is, for example, aluminum oxide carbide when a reduction-resistant material is aluminum oxide, and yttrium oxide carbide when a reduction-resistant material is yttrium oxide. The "aluminum oxide carbide" is a compound containing Al, O and C, for example, $Al_2OC$ and $Al_4O_4C$, and "yttrium oxide carbide" is a compound containing Y, O and C, for example, $Y_2OC$, $Y_4O_4C$, and the like.

The present invention is directed to a method of manufacturing a filter that removes particulate materials contained in exhaust gas, the method including a raw material mixing step that mixes ceramic particles having a predetermined average particle diameter, and fine particles that are the same material as the ceramic particles and have an average particle diameter being smaller than the predetermined average particle diameter to form a puddle, and a molding and firing step that molds the puddle to obtain a molded object and fires the molded object in a coexistence of a reduction-resistant material or a precursor thereof that is reduced by carbon contained in the particulate materials at a higher temperature than a temperature at which an oxide of an element contained in the ceramic particles is reduced, thereby sintering the molded object and allowing the ceramic particles protective material composed of the reduction-resistant material or the precursor thereof to exist on a surface of the ceramic particles.

This method of manufacturing a filter makes it possible to obtain a filter having a higher thermal resistance than a filter including a ceramic particles protective material that is an oxide of an element contained in ceramic particles.

The present invention is also directed to a method of manufacturing a filter that removes particulate materials contained in exhaust gas, the method including a raw material mixing step that mixes ceramic particles having a predetermined average particle diameter, fine particles that are the same material as the ceramic particles and have an average particle diameter being smaller than the predetermined average particle diameter, and a reduction-resistant material or a precursor thereof that is reduced by carbon contained in the particulate materials at a higher temperature than a temperature at which an oxide of an element contained in the ceramic particles is reduced to form a puddle; and a molding and firing step that molds the puddle to obtain a molded object and fires the molded object, thereby sintering the molded object and allowing the ceramic particles protective material composed of the reduction-resistant material or the precursor thereof to exist on a surface of the ceramic particles.

This method of manufacturing a filter also makes it possible to obtain a filter having a higher thermal resistance than a filter including a ceramic particles protective material that is an oxide of an element contained in ceramic particles. Herein, the molding and firing step may fire the molded object in a coexistence of the molded object and the reduction-resistant material or the precursor thereof and allow the ceramic particles protective material to exist on a surface of the molded object also by the coexistent reduction-resistant material or the precursor thereof.

In the method of manufacturing a filter of the present invention, in the raw material mixing step, it is preferable that the ceramic particles are, for example, one or more particles selected from silicon carbide, silicon nitride, silica, alumina, zirconia, titania, ceria and mullite. Among these materials, silicon carbide is more preferable. Silicon carbide is often used for a filter for removing particulate materials contained in exhaust gas and reacts with oxygen to be oxidized under an oxygen atmosphere at a higher temperature. Therefore, it is significant that the present invention applies to silicon carbide.

In the method of manufacturing a filter of the present invention, the raw material mixing step may further mix metal silicon to form a puddle. Since the metal silicon can bond ceramic particles at a lower temperature as compared with the case where metal silicon is not added, a firing temperature can be lowered. In this case, in the molding and firing step, a temperature for firing the molded object may be about 1100 to 1800° C.

In the method of manufacturing a filter of the present invention, in the molding and firing step, it is preferable that a temperature for firing the molded object is about 1600 to 2200° C. The firing temperature for the molded object of about 1600° C. or more enhances the strength of the filter and the firing temperature of about 2200° C. or less avoids increasing the environmental load from the viewpoint of consumption of thermal energy.

In the method of manufacturing a filter of the present invention, in the raw material mixing step, the predetermined average particle diameter of the ceramic particles is preferably about in a range of 5 to 100 μm and more preferably about in a range of 10 to 50 μm. It is thought that the average particle diameter of the ceramic particles of about 5 μm or more is preferable because the pore diameter does not become excessively small and the pressure loss of exhaust gas does not become excessively high, and that the average particle diameter of the ceramic particles of about 100 μm or less is preferable because joining portions between particles are not excessively decreased so as to lower the strength. Furthermore, in the raw material mixing step, the average particle diameter of the fine particles is preferably about in a range of 0.1 to 10 μm, and more preferably about in a range of 0.1 to 5 μm. It is thought that the average particle diameter of the fine particles of 0.1 μm or more is preferable because the fine particles are adequately dispersed and not coagulated to cause uneven sintering. It is thought that the average particle diameter of the fine particles of about 10 μm or less is preferable because the fine particles present in the binding portions (neck portions) between the ceramic particles are relatively small and the strength of the filter is not deteriorated.

The term "average particle diameter" in this specification denotes a value obtained by a laser diffraction scattering method by using a Mastersizer Micro (MALVERN).

In the method of manufacturing a filter of the present invention, in the raw material mixing step, it is preferable that the reduction-resistant material includes one or more materials selected from the group consisting of aluminum oxide, mullite, yttrium oxide, magnesium oxide, lithium oxide, calcium oxide and titanium oxide. These materials are not easily reduced as compared with oxide of an element contained in the ceramic particles. Among these materials, aluminum oxide (alumina) is more preferable. Alumina is relatively stable to heat and can protect ceramic particles at a high temperature.

The present invention is further directed to an exhaust gas purification device that removes particulate materials contained in exhaust gas from an internal combustion engine, and the method includes a connecting pipe connected to the internal combustion engine and through which exhaust gas from the internal combustion engine flows, any one of the above-mentioned filters, and a filter housing connected to the connecting pipe and accommodating the filter.

Since the exhaust gas purification device of the present invention uses the filter having an enhanced thermal resistance of the present invention, particulate materials can be burned at a higher temperature.

DETAILED DESCRIPTION OF THE PREFERRED EMBODIMENTS

Figure 1:
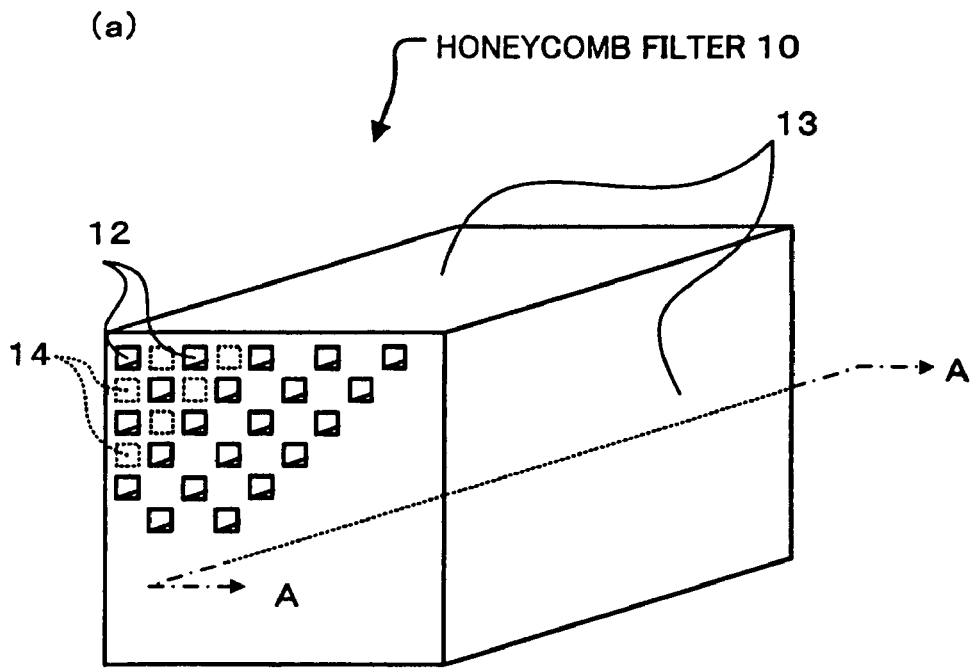
FIG. 1 illustrates a honeycomb filter 10 in accordance with the exemplary embodiment.
Figure 1:
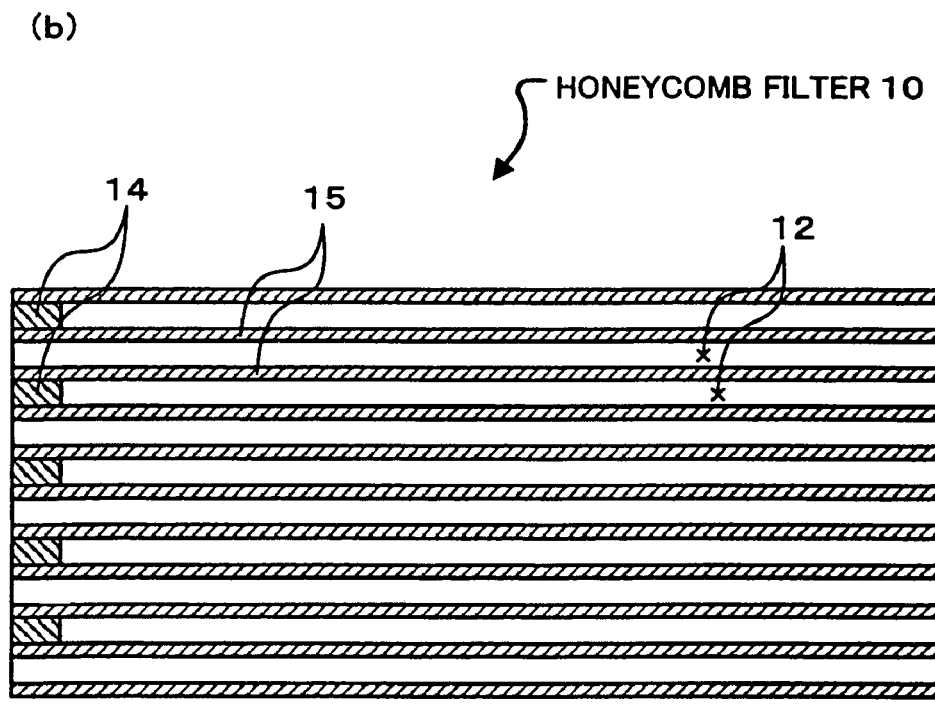

Hereinafter, best modes for carrying out the present invention will be described.

Firstly, a honeycomb filter of the exemplary embodiment will be described. FIG. 1(a) illustrates a honeycomb filter 10; and FIG. 1(b) shows a cross-sectional view taken along line A-A of FIG. 1(a). This honeycomb filter 10 is a diesel particulate filter (hereinafter, referred to as "DPF") having functions of filtering and burning particulate materials (hereinafter, referred to as "PM") in exhaust gas from the diesel engine in order to purify the exhaust gas. In this honeycomb filter 10, alternate end faces of a plurality of through holes 12 arranged in parallel along the longitudinal direction of the honeycomb filter 10 are sealed with sealing elements 14. This honeycomb filter 10 is formed so that an outside dimension is 34.3 mm×34.3 mm×150 mm, a thickness of a wall 15 between the through holes 12 is about in a range of 0.1 to 10.0 mm (more preferably, about in a range of 0.2 to 6.0 mm) and the number of the through holes 12 per unit area is about in a range of 0.16 to 62 holes/cm$^2$ (about 1.0 to 400 cpsi). The cross-sectional shape of the through hole may be, for example, substantially triangular shape and substantially hexagonal shape. Herein, the shape is square.

This honeycomb filter 10 includes silicon carbide that is ceramic particles as an aggregate, and alumina (aluminum oxide) as ceramic particles protective materials. This alumina is a reduction-resistant material that is reduced by carbon at a higher temperature than a temperature at which an oxide of Si (silica) contained in silicon carbide is reduced. The amount of silicon carbide contained in the honeycomb filter 10 is about in a range of 80 to 98% by weight, and the amount of alumina is about in a range of 2 to 20% by weight (more preferably, about in a range of 3 to 10% by weight). On the surface of silicon carbide particles of this honeycomb filter 10, a protective deposit including alumina and a precursor thereof ($Al_2OC$, $Al_4O_4C$, and the like) is formed. This protective deposit is formed on the surface of silicon carbide particles in the thickness of about in a range of 0.4 to 1000 nm (more preferably about in a range of 0.5 to 5 nm and most preferably about in a range of 0.6 to 1.5 nm).

Next, a method of manufacturing the honeycomb filter 10 of the present invention will be described in detail by step. The following is a description of a method of manufacturing the honeycomb filter 10 by using silicon carbide as ceramic particles (hereinafter referred to as "coarse grain silicon carbide"), silicon carbide as fine particles (hereinafter referred to as "fine grain silicon carbide") that are the same materials as the ceramic particles and have an average particle diameter smaller than that of the ceramic particles, and alumina as a ceramic particles protective material.

(1) Raw Material Mixing Step

Raw materials of a honeycomb filter including coarse grain silicon carbide to be used has an average particle diameter about in a range of 5 to 100 μm (preferably about in a range of 30 to 40 μm) and fine grain silicon carbide to be used has an average particle diameter about in a range of 0.1 to 10 μm (preferably about 0.5 μm). It is preferable that alumina to be used has an average particle diameter about in a range of 0.1 to 10 μm. Herein, alumina having an average particle diameter of 0.5 μm is used. Alumina is excellent in stability at a high temperature, has a high function as a ceramic particles protective material, and can promote the sintering of silicon carbide. As the mixing ratio of the raw materials, with respect to the total amount of coarse grain silicon carbide, fine grain silicon carbide and alumina, the amount of coarse grain silicon carbide is preferably about 50 to 70% by weight, the amount of fine grain silicon carbide is preferably about 20 to 35% by weight (more preferably about 25 to 30% by weight), and the amount of alumina is preferably about 1 to 30% by weight (more preferably about 3 to 7% by weight). The amount of coarse grain silicon carbide of 50% or more by weight is preferable because the amount of fine grain silicon carbide and/or alumina is not excessively increased and the pore diameter of the honeycomb filter becomes relatively large. The amount of coarse grain silicon carbide of about 70% or less by weight is preferable because the amount of fine grain silicon carbide and/or alumina is not excessively decreased and the strength of the filter is not weaken. Furthermore, the amount of fine grain silicon carbide of about 20% or more by weight is preferable because materials for forming binding portions (neck portions) of particles of coarse grain silicon carbide is sufficient so as to prevent the thermal conductivity and thermal shock resistance from being lowered. The amount of fine grain silicon carbide of about 35% or less by weight is preferable because the pore diameter of the honeycomb filter does not become excessively small. Furthermore, the amount of alumina of about 1% or more by weight is preferable because an aluminum component is easily present on the surface. The amount of alumina of about 30% or less by weight is preferable because aluminum components are not excessively present in the neck portions and the thermal conductivity and thermal shock resistance are not lowered.

Then, to 100 parts by weight of mixture of the above-mentioned coarse grain silicon carbide, fine grain silicon carbide and alumina, about in a range of 10 to 30 parts by weight of water is added and mixed to form a puddle. Dispersion medium may include, for example, an organic solvent (such as benzene) and alcohol (such as methanol), and the like, besides water. Besides these components, an organic binder or a molding aid may be appropriately added to this puddle in accordance with the molding property. Examples of the organic binder include, for example, one or more organic binders selected from methyl cellulose, carboxymethyl cellulose, hydroxyethyl cellulose, polyethylene glycol, phenol resin and epoxy resin. The mixing amount of the organic binder is preferably about in a range of 1 to 10 parts by weight with respect to 100 parts by weight of total of coarse grain silicon carbide, fine grain silicon carbide and alumina. Examples of the molding aid may include ethylene glycol, dextrin, fatty acid soap and polyalcohol. This puddle may be mixed by using, for example, a mixer, an attritor, and the like, or may be sufficiently kneaded by using a kneader.

(2) Molding and Firing Step

Then, the puddle including coarse grain silicon carbide, fine grain silicon carbide and alumina obtained in the raw material mixing step is molded into a form of a honeycomb. Molding a puddle can be carried out by extrusion molding, casting, press molding, and the like. Herein, extrusion molding is employed. Herein, since the above-mentioned puddle contains fine grain silicon carbide, molding is carried out in a state in which the fine grain silicon carbide enters between the particles of coarse grain silicon carbide. Shapes of the honeycomb filter to be molded may be appropriately selected in accordance with the application of use, etc., and any shapes and sizes can be selected. For example, the honeycomb filter may have a cylindrical shape, a square-pillar shape, or an elliptic cylindrical shape. Herein, the puddle is molded into a square-pillar shape having a plurality of through holes arranged in parallel along the longitudinal direction. The size of the through hole 12, the number of the through holes 12, the wall thickness between the through holes 12, and the like, may be appropriately selected in accordance with the purposes of use. The shape of the through hole may be rectangle or triangle or hexagon. Then, the obtained raw molded object is dried, and then only one end of each of the plurality of though holes is sealed with a paste having the similar composition to that of the puddle. Specifically, the through holes of a first type with pasted end faces and opposite open end faces and the through holes of a second type with open end faces and opposite pasted faces are arranged in a checker pattern.

Subsequently, the obtained raw molded object is dried and fired. The drying is carried out at a temperature of about 100 to 200° C. by using a microwave dryer, a hot air dryer, or the like. When an organic component such as an organic binder is added in the raw material mixing step, it is preferable that preliminary firing is carried out before firing for degreasing this organic component. The preliminary firing conditions are appropriately selected depending upon the amount or types of the added organic components, but, for example, the preliminary firing is carried out by heating at a temperature of about 300 to 650° C. under an oxygen atmosphere. Firing is carried out at a temperature of about 1600 to 2200° C. (preferably, about 1900 to 2100° C.) under an inert gas atmosphere of nitrogen, argon, and the like. Thus, the honeycomb filter 10 of this exemplary embodiment can be obtained.

Figure 2:
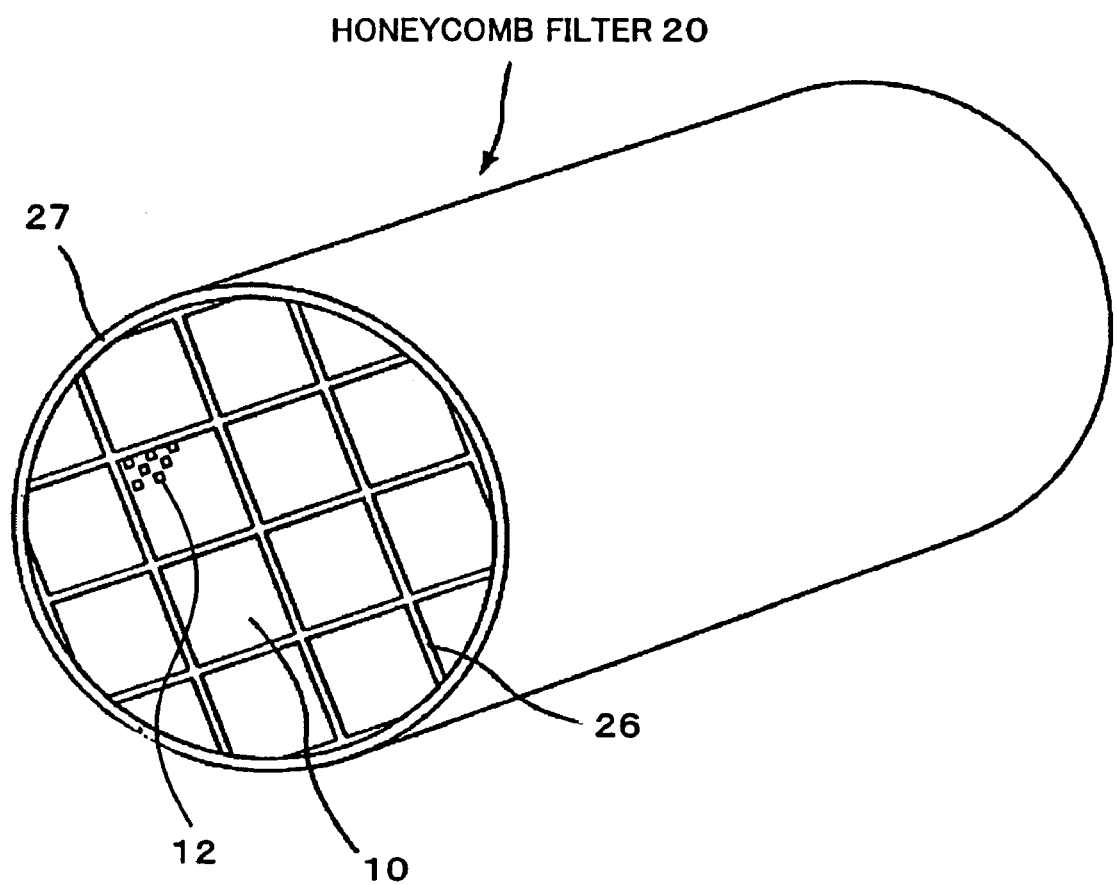
FIG. 2 illustrates a honeycomb filter 20 in accordance with the exemplary embodiment.
Figure 3:
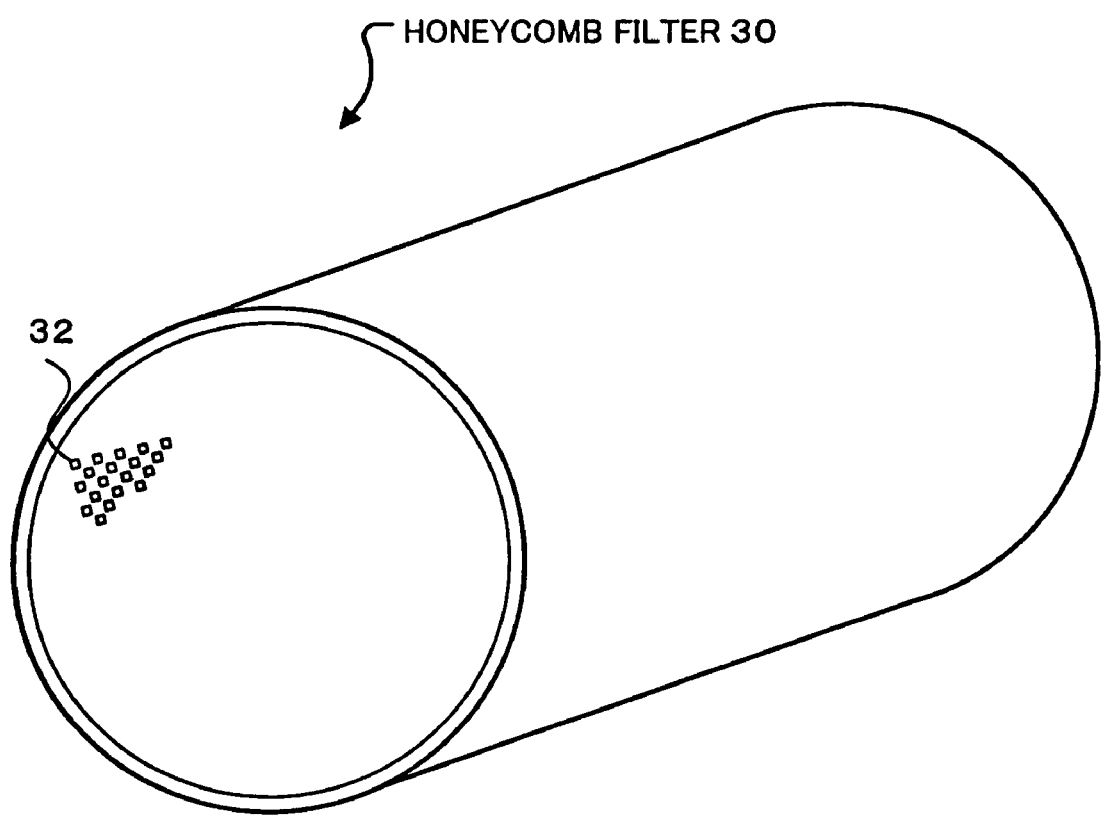
FIG. 3 illustrates a honeycomb filter 30 in accordance with the exemplary embodiment.

Herein, the method of manufacturing a square-pillar shaped honeycomb filter 10 was described. However, as shown in FIG. 2, a honeycomb filter 20 may be produced by joining a plurality of the honeycomb filters 10 and processing the joined product into a cylindrical shape. The method of manufacturing this honeycomb filter 20 will be described. The procedure firstly produces a plurality of the honeycomb filters 10, joins the plurality of honeycomb filters 10 by applying a sealing paste on an outer surface 13 of the honeycomb filter 10, and dries and solidifies this paste at about 120° C. to form a seal material layer 26. The procedure then cuts the joined product into a cylindrical shape with a diamond cutter and the like, coats an outer circumferential face on which the through holes 12 are not open with a paste similar to the sealing paste, and dries and solidifies thereof at about 120° C. to form a coating layer 27. Thus, honeycomb filter 20 can be obtained. Herein, the sealing paste containing at least one of inorganic fiber and inorganic particles and appropriately supplemented with inorganic binder or organic binder can be used. Examples of the inorganic fiber may include one or more ceramic fibers selected from silica-alumina, mullite, alumina, silica fibers, and the like. Examples of the inorganic particles may include one or more particles selected from silicon carbide, silicon nitride, boron nitride, and the like. Examples of the inorganic binder may include one or more binders selected from silica sol, alumina sol, and the like. Examples of the organic binder may include one or more selected from polyvinyl alcohol, methyl cellulose, ethyl cellulose, carboxymethyl cellulose, and the like. Also as shown in FIG. 3, a cylindrical-shaped honeycomb filter 30 having through holes 32 may be integrated and molded, and alternate end faces of the through holes 32 of this honeycomb filter 30 are provided with sealing elements 34 so as to form an integrated DPF.

In the honeycomb filter 10 obtained by this manufacturing method, alumina is present on the surface of the silicon carbide particles. When the trapped particulate materials are burned, silicon carbide as an aggregate is not easily oxidized even at quite a high temperature. The reason why such a high thermal resistance can be realized is not clarified under present circumstances but it is thought that the reason includes the following point. In a raw molded object before being fired, fine grain silicon carbide and alumina enter between the particles of coarse grain silicon carbide. When the molded object is fired at a high temperature, alumina together with fine grain silicon carbide is diffused onto the surface of coarse grain silicon carbide. At this time, alumina reacts with carbon and the like so as to produce, for example, a precursor of alumina such as aluminum oxide carbide ($Al_2OC$, $Al_4O_4C$, etc.). Then, it is presumed that a protective deposit of alumina and the precursor thereof is formed on the surface of coarse grain silicon carbide. Thereafter, it is presumed that when honeycomb filter 10 is subjected to a high temperature, this precursor is oxidized and further alumina is formed, so that a protective deposit of alumina is formed on the surface of silicon carbide particles.

In general, on the surface of silicon carbide, deposit of silica ($SiO_2$) that is an oxide of Si contained in silicon carbide is formed. This silica deposit serves as a protective deposit for protecting silicon carbide from being oxidized at a high temperature. The comparison between the case where a $SiO_2$ deposit is formed on the surface of silicon carbide and the case where an alumina ($Al_2O_3$) deposit that is a ceramic particles protective material is formed is described. The protective property of silicon carbide can be described from the difference in a reduction property between the $SiO_2$ deposit and the $Al_2O_3$ deposit by carbon (C) contained in particulate materials.

Figure 4:
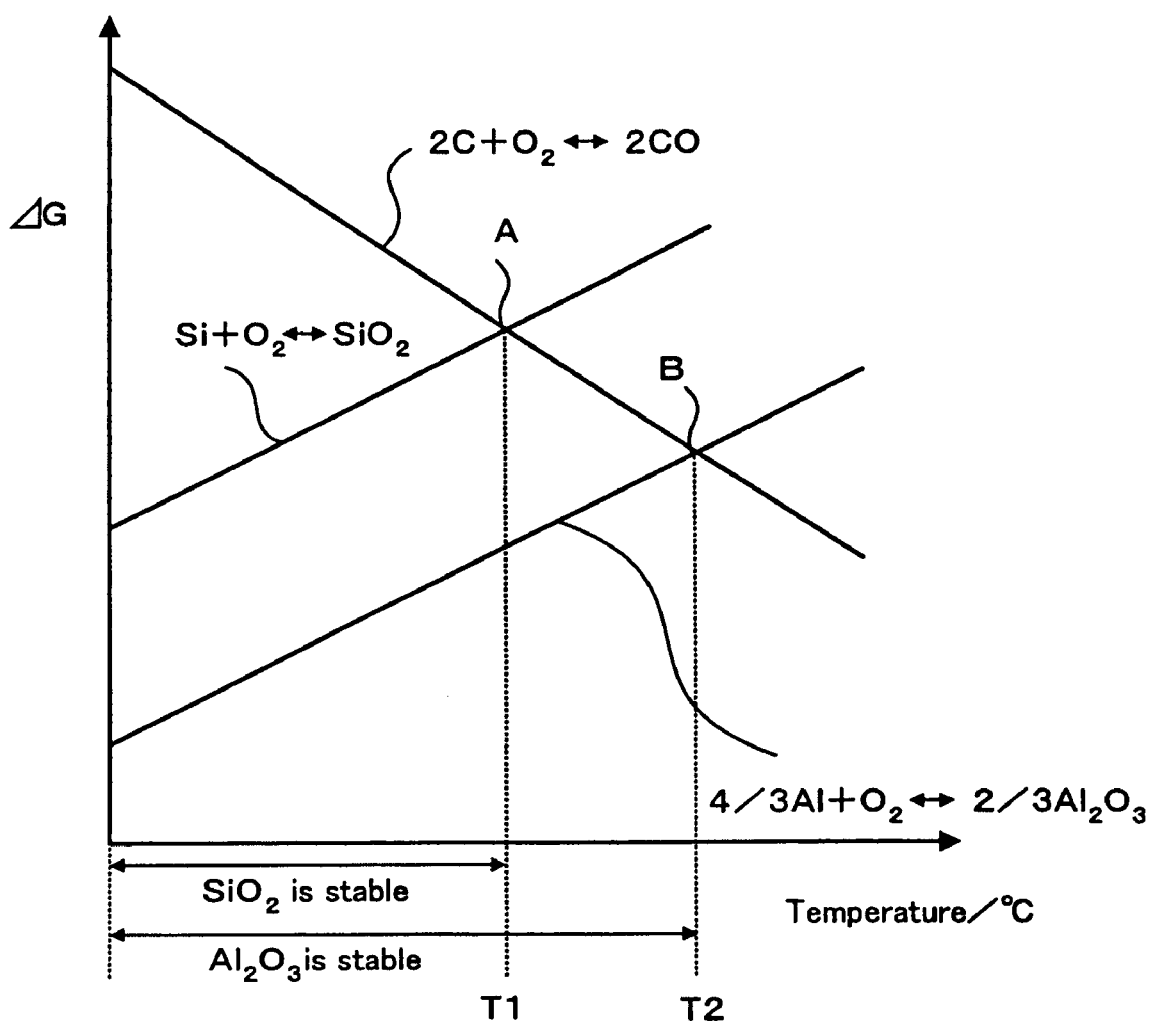
FIG. 4 is a graph showing variations of the standard free energy ΔG of Si, Al and C with respect to temperatures.

FIG. 4 shows the variations of the standard free energy $\Delta G$ of Si, Al and C with respect to temperatures. Oxide with smaller $\Delta G$ is more stable. The reaction of Si, Al and C with $O_2$ are shown in Relations (1) to (3), respectively. The case in which a protective deposit of silica is formed on the surface of silicon carbide is described by way of the relationship between $SiO_2$ and CO. As shown in FIG. 4, when the temperature is lower than Tl, $SiO_2$ having smaller $\Delta G$ is more stable relative to CO. Therefore, even when $SiO_2$ and C are present, $SiO_2$ is not reduced. On the other hand, when the temperature is higher than Tl, the stabilities of $SiO_2$ and CO are reversed at the point A shown in FIG. 4 and CO having smaller $\Delta G$ becomes more stable relative to $SiO_2$. Therefore, when $SiO_2$ and C are present, $SiO_2$ is reduced to Si, and C is oxidized to CO. Next, the case in which a protective deposit of alumina is formed is described by way of the relationship between $Al_2O_3$ and CO. As shown in FIG. 4, when the temperatures is lower than T2 that is sufficiently higher than the temperature T1, $Al_2O_3$ having smaller $\Delta G$ is more stable relative to CO. Therefore, even when $Al_2O_3$ and C are present, $Al_2O_3$ is not reduced. On the other hand, when the temperature is higher than T2, the stabilities of $Al_2O_3$ and CO are reversed at the point B shown in FIG. 4 and CO having smaller $\Delta G$ is more stable relative to $Al_2O_3$. Therefore, when $Al_2O_3$ and C are present, $Al_2O_3$ is reduced to Al, and C is oxidized to CO. These results show that $SiO_2$ is not reduced and prevents oxidization of silicon carbide until the temperature becomes T1 and that $Al_2O_3$ is not reduced and stably prevents oxidation of silicon carbide until the temperature becomes T2 that is higher than temperature T1. Consequently, in the honeycomb filter 10, in a case where silicon carbide is protected by a $SiO_2$ deposit, when a temperature becomes higher than T1, the $SiO_2$ deposit is reduced by carbon contained in PM and decreased and the function as a protective deposit is lowered. Then, as shown in Relations (4) to (6), Si contained in silicon carbide is decreased because it is vaporized as SiO (g: gas). This SiO is oxidized by oxygen inside the through holes 12 of the honeycomb filter 10 to produce white fibrous or whisker $SiO_2$ to be precipitated inside the through hole 12.

On the other hand, in a case where silicon carbide is protected by an $Al_2O_3$ deposit, silicon carbide can be protected until a temperature becomes T2 that is higher than T1.

$$Si+O_2 \rightarrow SiO_2 \qquad (1)$$

$$\tfrac{4}{3}Al+O_2 \rightarrow \tfrac{2}{3}Al_2O_3 \qquad (2)$$

$$2C+O_2 \rightarrow CO \qquad (3)$$

$$2Si+O_2 \rightarrow 2SiO(g)\uparrow \qquad (4)$$

$$SiC+O_2 \rightarrow SiO(g)\uparrow + CO(g)\uparrow \qquad (5)$$

$$SiO_2+C \rightarrow SiO(g)\uparrow + CO(g)\uparrow \qquad (6)$$

Figure 5:
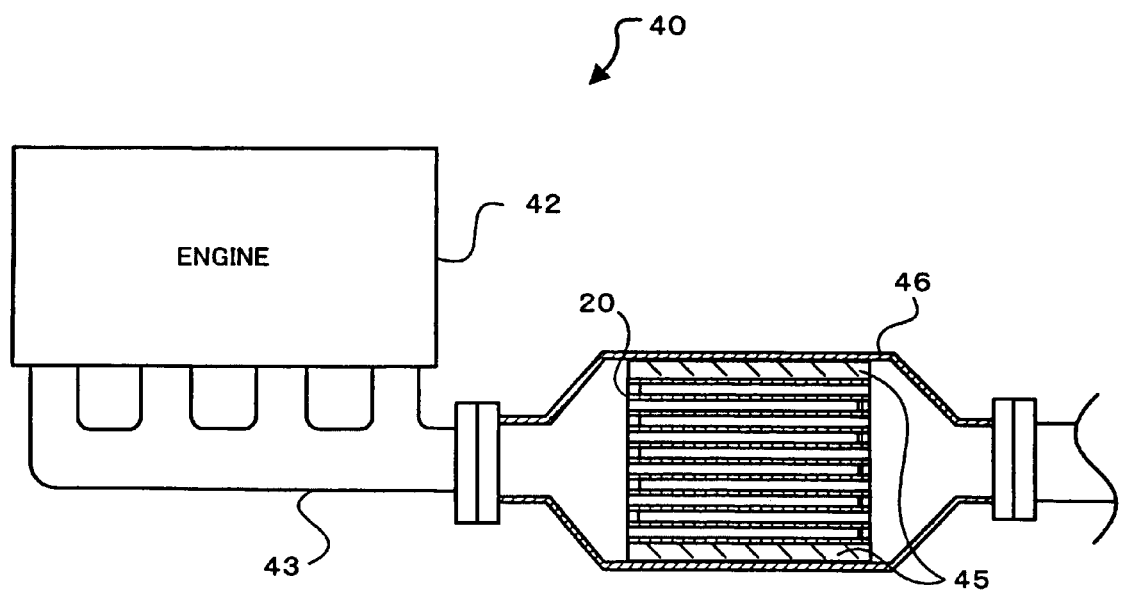
FIG. 5 illustrates an exhaust gas purification device 40 in accordance with the exemplary embodiment.

An exhaust gas purification device using the honeycomb filter 20 obtained by the above-mentioned manufacturing method is described. FIG. 5 illustrates an exhaust gas purification device 40 in accordance with an exemplary embodiment. The exhaust gas purification device 40 includes a diesel type engine 42, a manifold 43 (corresponding to a connecting pipe of the present invention) connected to the engine 42, a honeycomb filter 20 connected to the manifold 43 and carrying a catalyst component, and a casing 46 (corresponding to a filter housing of the present invention) holding the honeycomb filter 20 via an alumina mat 45, and it is mounted on a vehicle. Exhaust gas from the engine 42 contains nitrogen oxide (NOx), hydrocarbon (HC) and carbon monoxide (CO) as well as PM generated from carbon contained in a fuel. The honeycomb filter 20 is a DPF for removing PMs contained in exhaust gas from the engine 42. This honeycomb filter 20 is produced by the above-mentioned manufacturing method. As shown in FIG. 2, the honeycomb filter 20 is processed in a cylindrical shape by joining a plurality of the honeycomb filters 10 having a plurality of through holes 12 arranged in parallel along the longitudinal direction. This honeycomb filter 20 is held by the alumina mat 45 and fixed in the metal casing 46.

Next, the operation of the exhaust gas purification device 40 will be described. When the engine 42 is started, exhaust gas containing PMs are exhausted from the engine 42 to the exhaust pipe 44 via the manifold 43. When the exhaust gas passes through walls 15 (see FIG. 1), the PMs are trapped by the walls 15. After the PMs are trapped for a certain period, the trapped PMs are burned. At this time, the temperature of the honeycomb filter 20 may become high (for example, higher than the temperature T1) due to burning of PMs. However, as mentioned above, since a protective deposit of alumina is formed, silicon carbide of the honeycomb filter 20 is not easily oxidized.

In the above-mentioned honeycomb filter 10, etc., it is presumed that a protective deposit of alumina is formed on the surface of silicon carbide particles. However, even if the protective deposit was not formed in such a way, according to the manufacturing method of the filter of the present invention, the thermal resistance of the filter can be enhanced. Furthermore, it can be said that the honeycomb filter obtained by this manufacturing method has a high thermal resistance.

According to the above-mentioned exemplary embodiment, since alumina that is a reduction-resistant material is present as a protective deposit on the surface of silicon carbide, as compared with the case where a protective deposit is formed of $SiO_2$ that is an oxide of Si contained in silicon carbide, silicon carbide can be protected until the temperature becomes higher. Consequently, the thermal resistance of the honeycomb filter 10 can be enhanced.

Needless to say, the present invention is not limited to the above-mentioned exemplary embodiment but various embodiments within the scope of the technical field of the present invention can be carried out.

For example, in the above-mentioned exemplary embodiment, alumina is present as a protective deposit on the surface of silicon carbide particles, but it is not always necessary to form a perfect protective deposit of alumina. Even when the perfect alumina is not present, the thermal resistance of at least a part in which alumina is present is improved.

Furthermore, in the above-mentioned molding and firing step, when a raw molded object is fired in the absence of oxygen, alumina may be present on the surface of ceramic particles of the honeycomb filter 10 by firing the molded object in the coexistence of alumina. As the conditions for allowing alumina to coexist, it is preferable that about 80 to 400 parts by weight of alumina is allowed to coexist with respect to 1500 parts by weight of honeycomb filter. An example of a method for allowing alumina to coexist includes a method of placing alumina powder on a tray of carbon, etc. and a method of filling alumina powder inside through holes. At this time, in the above-mentioned raw material mixing step, a molded object is produced by mixing alumina. However, alumina may be allowed to exist on the surface of ceramic particles of the honeycomb filter 10 by mixing coarse grain silicon carbide and fine grain silicon carbide without adding alumina in the raw material mixing step and firing the mixture in the coexistence of alumina in the molding and firing step.

Furthermore, the raw material mixing step mixes coarse grain silicon carbide, fine grain silicon carbide and alumina. But, metal silicon may be added thereto. Thus, a firing temperature of silicon carbide can be lowered. As the mixing ratio of raw materials at this time, with respect to the total of coarse grain silicon carbide, fine grain silicon carbide, metal silicon and alumina, the amount of coarse grain silicon carbide is preferably about in a range of 50 to 70% by weight, the amount of fine grain silicon carbide is preferably about in a range of 5 to 35% by weight (more preferably, about in a range of 10 to 30% by weight), the amount of metal silicon is preferably about in a range of 5 to 35% by weight (more preferably, about in a range of 10 to 30% by weight), and the amount of alumina is preferably about in a range of 1 to 30% by weight (more preferably, about in a range of 3 to 7% by weight). At this time, in the molding and firing step, the molded object can be sintered at a firing temperature of about 1100° C. to 1800° C.

EXAMPLES

Hereinafter, examples of specifically manufacturing a honeycomb structure 10 will be described as examples.

Example 1

The procedure of Example 1 firstly mixed 6750 parts by weight of α-silicon carbide powder (average particle diameter: 40 μm) as ceramic particles, 2950 parts by weight of a-silicon carbide powder (average particle diameter: 0.5 μm) as fine particles, 300 parts by weight of γ-alumina (average particle diameter: 0.5 μm) as a sintering aid, and 1800 parts by weight of water to give a mixture. The procedure further added 600 parts by weight of methyl cellulose as an organic binder, 150 parts by weight of glycerin as a plasticizer, and 330 parts by weight of lubricant (trade name: UNILUB, NOF Corporation) to the mixture and kneaded the whole mixed composition to form a puddle. This puddle was extrusion molded by an extruder into a raw molded object having a square-pillar shape provided with a plurality of through holes having a squared-shaped cross section along the longitudinal direction thereof. The procedure dried the obtained raw molded object a microwave dryer. Alternate end faces of the plurality of through holes arranged in parallel along the longitudinal direction of the molded object were sealed with a paste formed of composition similar to the above-mentioned puddle. The molded object was further dried and degreased at 400° C. for 3 hours. This degreased molded object was fired at 2000° C. at ordinary pressure under an argon atmosphere for 3 hours to form a honeycomb structure 10 composed of fired silicon carbide as shown in FIG. 1(*a*). The honeycomb structure 10 has a size of 34.3 mm×34.3 mm×150 mm, 31 holes/cm$^2$ (200 cpsi) of through holes, and 0.3 mm-thick partition walls (Example 1).

Numerical values etc. with respect to the raw materials of the honeycomb filter 10 of Example 1, that is, the average particle diameters of coarse grain silicon carbide, fine grain silicon carbide and alumina; the mixing ratios of coarse grains, fine grains and alumina; and firing temperatures are shows in Table 1. Each mixing ratio of coarse silicon carbide, fine silicon carbide and alumina is shown by weight % with respect to the whole composition. Table 1 further shows the contents regarding Examples 2 to 9 mentioned below. Table 1 also shows the measurement results of the below-mentioned three-point bending strength, average pore diameter, thickness of alumina and results of excessive PM regeneration test.

TABLE 1

| Sample | [1])Coarse Grain Particle Diameter μm | [2])Fine Grain Particle Diameter μm | Alumina Particle Diameter μm | Coarse Grain Mixing Ratio % by weight | Fine Grain Mixing Ratio % by weight | Alumina Mixing Ratio % by weight | Firing Temperature ° C. | Three-point Bending Strength MPa | Average Pore Diameter μm | Thickness of Alumina Deposit nm | Excessive PM Regeneration Test |
|---|---|---|---|---|---|---|---|---|---|---|---|
| Example 1 | 40 | 0.5 | 0.5 | 67.5 | 29.5 | 3.0 | 2000 | 23.6 | 25.9 | 0.6 | ◯ |
| Example 2 | 40 | 0.5 | 0.5 | 66.5 | 28.5 | 5.0 | 2000 | 26.7 | 26.2 | 0.8 | ◯ |
| Example 3 | 40 | 0.5 | 0.5 | 65.5 | 27.5 | 7.0 | 2000 | 25.3 | 25.4 | 1.5 | ◯ |

TABLE 1-continued

| Sample | [1] Coarse Grain Particle Diameter μm | [2] Fine Grain Particle Diameter μm | Alumina Particle Diameter μm | Coarse Grain Mixing Ratio % by weight | Fine Grain Mixing Ratio % by weight | Alumina Mixing Ratio % by weight | Firing Temperature °C | Three-point Bending Strength MPa | Average Pore Diameter μm | Thickness of Alumina Deposit nm | Excessive PM Regeneration Test |
|---|---|---|---|---|---|---|---|---|---|---|---|
| Example 4 | 30 | 0.5 | 0.5 | 66.5 | 28.5 | 5.0 | 2000 | 26.1 | 23.5 | 0.9 | ○ |
| Example 5 | 30 | 0.5 | 0.5 | 65.5 | 27.5 | 7.0 | 2000 | 26.3 | 23.9 | 1.4 | ○ |
| Example 6 | 40 | 0.5 | 0.5 | 68.5 | 30.5 | 1.0 | 2000 | 9.1 | 25.3 | 0.4 | ○ |
| Example 7 | 40 | 0.5 | 0.5 | 66.5 | 28.5 | 5.0 | 1600 | 7.8 | 23.4 | 0.4 | ○ |
| Example 8 | 40 | 0.5 | — | 70.0 | 30.0 | — | 2000 | 7.1 | 25.6 | — | X |
| Example 9 | 40 | — | 0.5 | 95.0 | — | 5.0 | 2000 | 8.4 | 26.1 | 0.3 | X |

[1] Coarse Grain:Ceramic Particle:Silicon Carbide
[2] Fine Grain:Fine Particle:Silicon Carbide

Examples 2 to 9

Honeycomb filters were produced by the same way as in Example 1 except for designing honeycomb filters to have mixing ratios and firing temperatures, and the like, shown in Table 1. In Example 7, the mixing ratio was the same as in Example 2 and the firing temperature was 1600° C.; in Example 8, alumina as a ceramic particles protective material was not added; and in Example 9, fine particles of silicon carbide were not added.

Example 10

Honeycomb filter 10 was produced by designing the honeycomb filter to have the mixing ratio or shape as in Example 2, placing alumina in a tray made of carbon so that 100 g of alumina coexisted to 10 honeycomb filters, and firing a raw molded object at 2000° C. under an argon atmosphere. Numerical values, etc. with respect to the raw materials of the honeycomb filter of Example 10, that is, the average particle diameters of coarse grain silicon carbide, fine grain silicon carbide and alumina, the mixing ratios of coarse grains, fine grains and alumina, firing temperatures, and the amount of coexistent alumina are shows in Table 2. Each mixing ratio of coarse silicon carbide, fine silicon carbide and alumina is shown by weight % with respect to the whole composition. Table 2 further shows contents regarding Examples 11 to 16 mentioned below. Table 2 also shows the measurement results of the below-mentioned three-point bending strength, average pore diameter, thickness of alumina, and results of excessive PM regeneration test.

TABLE 2

| Sample | [1] Coarse Grain Particle Diameter μm | [2] Fine Grain Particle Diameter μm | Alumina Particle Diameter μm | Coarse Grain Mixing Ratio % by weight | Fine Grain Mixing Ratio % by weight | Alumina Mixing Ratio % by weight | Metal Silicon Mixing Ratio % by weight | Firing Temperature °C | [3] Amount of Coexisting Alumina g | Three-point Bending Strength MPa | Average Pore Diameter μm | Thickness of Alumina Deposit nm | Excessive PM Regeneration Test |
|---|---|---|---|---|---|---|---|---|---|---|---|---|---|
| Example 2 | 40 | 0.5 | 0.5 | 66.5 | 28.5 | 5.0 | | 2000 | 0 | 26.7 | 26.2 | 0.8 | ○ |
| Example 10 | 40 | 0.5 | 0.5 | 66.5 | 28.5 | 5.0 | | 2000 | 100 | 23.6 | 25.9 | 1.8 | ○ |
| Example 11 | 40 | 0.5 | 0.5 | 66.5 | 28.5 | 5.0 | | 2000 | 200 | 26.7 | 26.2 | 2.2 | ○ |
| Example 12 | 40 | 0.5 | 0.5 | 66.5 | 28.5 | 5.0 | | 2000 | 300 | 25.3 | 25.4 | 2.8 | ○ |
| Example 13 | 40 | 0.5 | 0.5 | 66.5 | 28.5 | 5.0 | | 2000 | 400 | 26.1 | 23.5 | 3.4 | ○ |
| Example 14 | 40 | 0.5 | — | 70.0 | 30.0 | — | | 2000 | 200 | 7.1 | 25.8 | 0.8 | ○ |
| Example 15 | 40 | — | 0.5 | 95.5 | — | 5.0 | | 2000 | 0 | 8.4 | 26.1 | 0.3 | X |
| Example 16 | 40 | 0.5 | 0.5 | 66.5 | 20.0 | 5.0 | 8.5 | 1450 | 100 | 15.3 | 24.3 | 1.8 | ○ |

[2] Coarse Grain:Ceramic Particle:Silicon Carbide
[2] Fine Grain:Fine Particle:Silicon Carbide
[3] Amount of alumina allowed to coexist with respect to 10 honeycomb structures (34 × 34 × 150 cm) inside a firing furnace

Examples 11 to 15

Honeycomb filters were produced by the same way as in Example 10 except for designing honeycomb filters to have mixing ratios and firing temperatures, and the like, shown in Table 2. In Example 14, alumina as a ceramic particles protective material was not added, and in Example 15, fine particles of silicon carbide were not added.

Example 16

The procedure firstly mixed 6650 parts by weight of α-silicon carbide powder (average particle diameter: 40 μm) as ceramic particles; 2000 parts by weight of α-silicon carbide powder (average particle diameter: 0.5 μm) as fine particles; 850 parts by weight of metal silicon (average particle diameter: 4 μm); 500 parts by weight of γ-alumina (average particle diameter: 0.5 μm) as a ceramic particles protective material; and 2400 parts by weight of water to give a mixture. The procedure further added 600 parts by weight of methyl cellulose as an organic binder, 100 parts by weight of glycerin as a plasticizer, and 150 parts by weight of lubricant (trade name: UNILUB, NOF Corporation) to the mixture and kneaded the whole mixed composition to form a puddle. This puddle was molded by the same method as in Example 1 and alumina was placed in a tray made of carbon so that 100 g of alumina coexisted with respect to 10 honeycomb filters and a raw molded object was fired at 1450° C. under an argon atmosphere so as to produce honeycomb filter 10 shown in FIG. 1 (a) (Example 16).

[Three-point Bending Strength]

Three-point bending strength of Examples 1 to 16 were measured. This measurement was carried out based on JIS-R1601 by using a 5582 (Instron) as a measuring instrument. Concretely, the crosshead speed was set to 0.5 mm/min and a distance between spans was set to 125 mm. Breaking load was measured by applying load vertically to the through holes 12 of the square-pillar shaped honeycomb filter 10 shown in FIG. 1(a) and geometrical moment of inertia was calculated from the wall thickness and structure of a honeycomb, etc., so as to calculate the strength. The contents of JIS-R1601 are incorporated herein by reference in their entirety.

[Measurement of Average Pore Diameter]

Average pore diameters of Examples 1 to 16 were measured. This measurement was carried out by a mercury press-in method based on JIS-R1655 by using automated porocimeter Auto Pore III 9405 (Shimadzu). Concretely, the procedure cut the honeycomb filters 10 into cubes of about 0.8 cm, carried out ultrasonic cleansing them with ion exchanged water and dried. Thereafter, the measurement was carried out with the above-mentioned measuring instrument in a measurement range of 0.2 to 500 µm. The measurement was carried out every 0.1 psia of pressure in a range of 100 to 500 µm and every 0.25 psia of pressure in a range of 0.2 to 100 µm. The contents of JIS-R1655 are incorporated herein by reference in their entirety.

[Measurement of Thickness of Alumina Deposit]

The thicknesses of alumina deposit in Examples 1 to 16 were measured. This measurement was carried out by an etching method using PHI-700 type Auger electron spectrometer (ULVAC-PHI) as a measurement instrument.

[Excessive PM Regeneration Test]

Excessive PM regeneration tests of Examples 1 to 16 at a high temperature were carried out. This test observes the change of honeycomb filter 10 after an excessive amount of PMs were burned. Test conditions were as follows: the procedures of the test allows Examples 1 to 16 to trap particulate materials so that the amount of particulate materials per unit volume of the honeycomb filter 10 became 20 g/L and forcedly burns the particulate materials for regeneration. Evaluation was carried out by making visual observation of the surface of samples after particulate materials were burned. Evaluation results show "x" when the samples were changed after the test and "o" when the samples were not changed after the test.

[TEM Observation]

TEM observation of Example 2 was carried out. For TEM, HF-2000 (HITACHI) was used. Analyses of elements at arbitrary sites were carried out. This analyses of elements were carried out by the use of EDS.

[Experimental Results]

Figure 6:
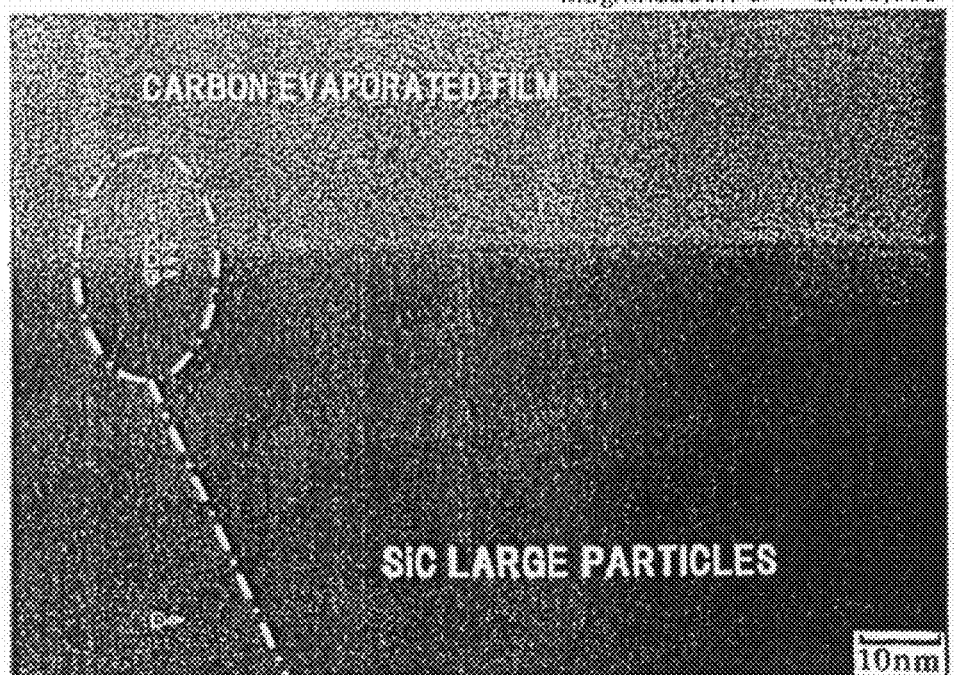
FIG. 6 shows a TEM photograph of the cross-section of a honeycomb filter in accordance with the exemplary embodiment.
Figure 6:
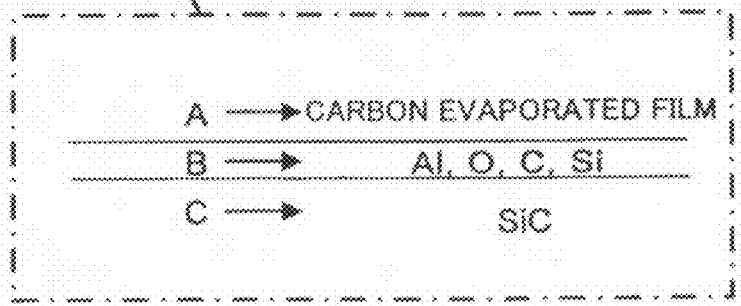
Figure 6:
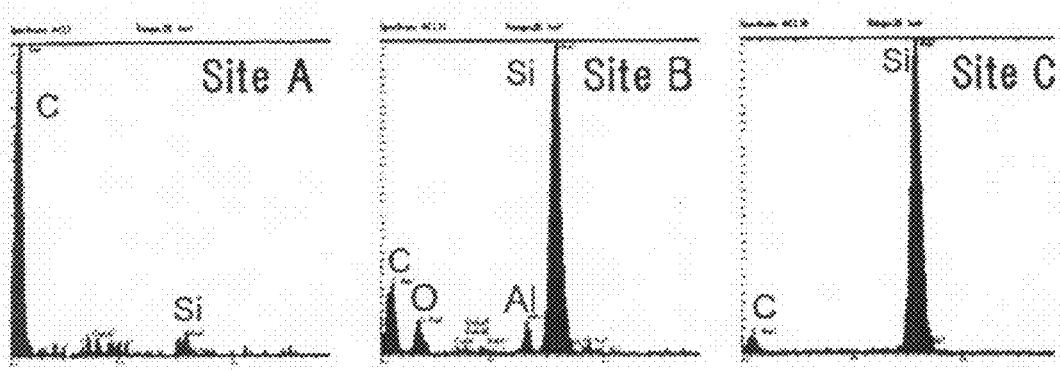

FIG. 6(a) shows a TEM photograph of sliced sample of Example 2. FIG. 6(b) shows the results of analyses of elements in sites A, B and C of the photograph of FIG. 6(a), respectively. This result showed that in the site C that is a bulk portion, only Si and C were detected. On the other hand, in the site B, Al and O in addition to Si and C were detected. The distance between the site B and site C is about 1 mm. This result showed that Al caused by the added alumina was present on the surface of the silicon carbide particles as an aggregate. Since a sample obtained by forming a carbon evaporated film and subjecting it to SEM observation was used for TEM observation, in the site A, carbon (C) caused by carbon-evaporated film was detected.

Figure 7:
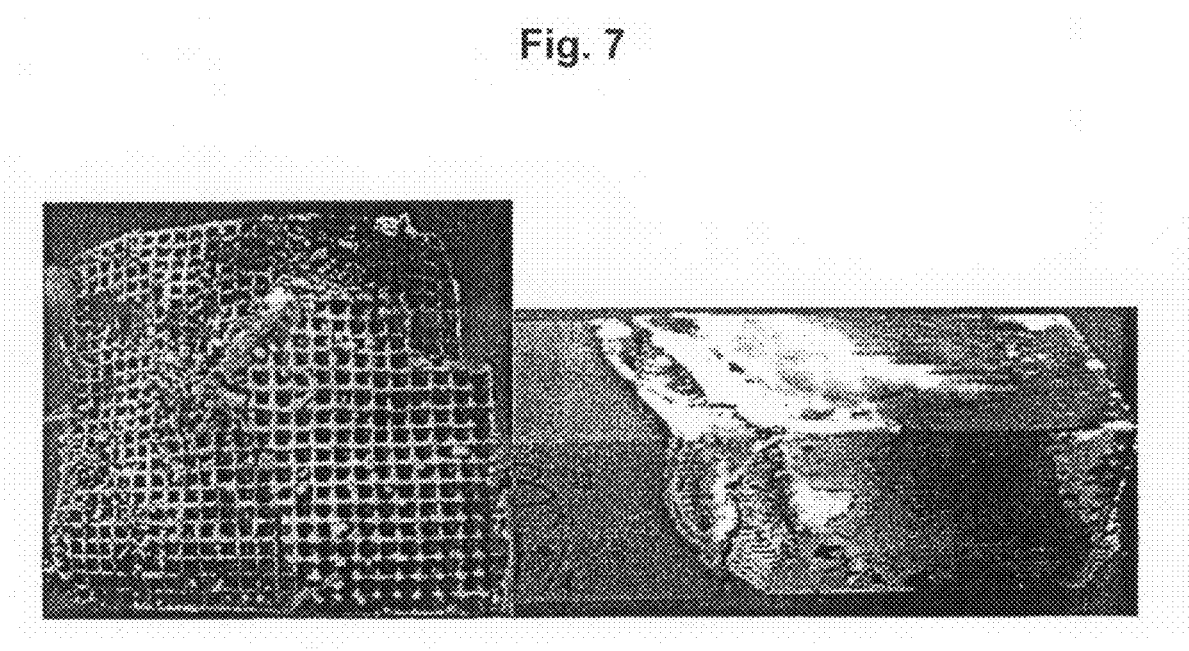
FIG. 7 is a photograph showing the outside of the honeycomb filter after an excessive PM regeneration test is carried out.

The measurement results of three-point bending strength, average pore diameter, thickness of alumina deposit and excessive PM regeneration test of Examples 1 to 9 are shown in Table 1 and those of Examples 10 to 16 are shown in Table 2, respectively. As is apparent from Tables 1 and 2, as the increase in the mixing ratio of alumina, the thickness of alumina deposit was increased. In Example 8 in which alumina was not added and in Examples 9 and 15 in which fine particles of silicon carbide were not added, an alumina deposit was not observed or very thin alumina deposit was observed and the honeycomb filters were whitened and deformed in the excessive PM regeneration Test. On the other hand, such changes in color and shape were not observed in Examples 1 to 7, 10 to 14 and 16, which showed the improvement in the thermal resistance. FIG. 7 shows photographs after the excessive PM Regeneration Test of Example 8 was carried out. A part that became relatively high temperature due to burning heat of PM was vitrified in white. This was presumed to be fibrous or whisker silica. When firing was carried out in the coexistence of alumina and the thickness of alumina became thick and it was presumed that alumina was evaporated. Also in the sample mixing metal silicon, the same results were obtained. Therefore, it was shown that this method of manufacturing a filter could enhance the thermal resistance of the honeycomb filter 10. It was shown that the honeycomb filter 10 manufactured by this method had a high thermal resistance since it did not change the appearance even when an excessive amount of PMs were burned and the temperature became high (1500° C. or more).

[Exhaust Gas Purification Device]

The procedure firstly produced a plurality of the respective honeycomb filters 10 of Examples 1 to 16, joined the plurality of honeycomb filters 10 by a sealing material layer 26 that was obtained by applying a sealing paste on an outer surface 13 of the honeycomb filter 10 and drying and solidifying thereof at 120° C., cut the joined product into a cylindrical shape (diameter: 143.8 mmφ×height 150 mm) by using a diamond cutter and the like. The outer circumferential face on which the through holes 12 were not open of this cylindrical-shaped product was coated with coating paste to form a coating material layer 27, followed by drying at 120° C. for one hour. Thus, the honeycomb filter 20 was obtained. The outer circumferential face of this honeycomb filter 20 was wound by an alumina mat 45 and contained in a metallic casing 46 to be fixed. Thus, an exhaust gas purification device 40 shown in FIG. 5 was obtained. Herein, the procedure used a sealing paste having a composition of 30% by weight of alumina fiber (fiber length: 20 µm), 21% by weight of silicon carbide particles (average particle diameter: 0.6 µm), 15% by weight of silica sol (content of silica in sol: 30% by weight), 5.6% by weight of carboxymethyl cellulose, and 28.4% by weight of water. Furthermore, the procedure used a coating paste having a composition of 23.3% by weight of silica-alumina fiber (fiber length: 5 to 100 µm), 30.2% by weight of silicon carbide particles (average particle diameter: 0.3 µm), 7% by weight of silica sol (content of silica in sol: 30% by weight), 0.5% by weight of carboxymethyl cellulose, and 39% by weight of water.

The present invention claims benefit of priority to Japanese Patent Application No. 2004-188857, filed on Jun. 25, 2004, the contents of which is incorporated by reference herein. The present invention is a continuation application of International Application No. PCT/JP2005/012144, the contents of which are incorporated herein in their entirety.

What is claimed is:

1. A filter for removing particulate materials contained in exhaust gas, comprising:
   ceramic particles as an aggregate; and
   a ceramic particles protective material that is present on a surface of the ceramic particles and composed of a reduction-resistant material or a precursor thereof being reduced by carbon contained in the particulate materials at a higher temperature than a temperature at which an oxide of an element contained in the ceramic particles is reduced,
   wherein the reduction-resistant material or the precursor thereof is uniformly distributed throughout the body of the filter.

2. The filter according to claim 1, wherein the ceramic particles are silicon carbide.

3. The filter according to claim 1, wherein the ceramic particles protective material is present as a protective deposit on a surface of the ceramic particles.

4. The filter according to claim 3, wherein a thickness of the protective deposit is about in a range of 0.4 to 1000 nm.

5. The filter according to claim 1, wherein the reduction-resistant material includes one or more materials selected from the group consisting of aluminum oxide, mullite, yttrium oxide, magnesium oxide, lithium oxide, calcium oxide and titanium oxide.

6. A method of manufacturing a filter for removing particulate materials contained in exhaust gas, the method comprising:
   a raw material mixing step that mixes ceramic particles having a predetermined average particle diameter, and fine particles that are the same material as the ceramic particles and have an average particle diameter being smaller than the predetermined average particle diameter to form a puddle; and
   a molding and firing step that molds the puddle to obtain a molded object and fires the molded object in a coexistence with a reduction-resistant material or a precursor thereof that is reduced by carbon contained in the particulate materials at a higher temperature than a temperature at which an oxide of an element contained in the ceramic particles is reduced, thereby sintering the molded object and allowing the ceramic particles protective material composed of the reduction-resistant material or the precursor thereof to exist on a surface of the ceramic particles.

7. A method of manufacturing a filter for removing particulate materials contained in exhaust gas, the method comprising:
   a raw material mixing step that mixes ceramic particles having a predetermined average particle diameter, fine particles that are the same material as the ceramic particles and have an average particle diameter being smaller than the predetermined average particle diameter, and a reduction-resistant material or a precursor thereof that is reduced by carbon contained in the particulate materials at a higher temperature than a temperature at which an oxide of an element contained in the ceramic particles is reduced to form a puddle; and
   a molding and firing step that molds the puddle to obtain a molded object and fires the molded object, thereby sintering the molded object and allowing the ceramic particles protective material composed of the reduction-resistant material or the precursor thereof to exist on a surface of the ceramic particles.

8. The method of manufacturing a filter according to claim 7, wherein the molding and firing step fires the molded object in a coexistence with the molded object and the reduction-resistant material or the precursor thereof, and allows the ceramic particles protective materials to exist on a surface of the molded object also by the reduction-resistant material or the precursor thereof.

9. The method of manufacturing a filter according to claim 6, wherein in the raw material mixing step, the ceramic particles are silicon carbide.

10. The method of manufacturing a filter according to claim 7, wherein in the raw material mixing step, the ceramic particles are silicon carbide.

11. The method of manufacturing a filter according to claim 9, wherein the raw material mixing step further mixes metal silicon to form a puddle.

12. The method of manufacturing a filter according to claim 10, wherein the raw material mixing step further mixes metal silicon to form a puddle.

13. The method of manufacturing a filter according to claim 11, wherein in the molding and firing step, a temperature for firing the molded object is about in a range of 1100 to 1800° C.

14. The method of manufacturing a filter according to claim 12, wherein in the molding and firing step, a temperature for firing the molded object is about in a range of 1100 to 1800° C.

15. The method of manufacturing a filter according to claim 6, wherein in the molding and firing step, a temperature for firing the molded object is about in a range of 1600 to 2200° C.

16. The method of manufacturing a filter according to claim 7, wherein in the molding and firing step, a temperature for firing the molded object is about in a range of 1600 to 2200° C.

17. The method of manufacturing a filter according to claim 6, wherein in the raw material mixing step, the predetermined average particle diameter is about in a range of 5 to 100 μm.

18. The method of manufacturing a filter according to claim 7, wherein in the raw material mixing step, the predetermined average particle diameter is about in a range of 5 to 100 μm.

19. The method of manufacturing a filter according to claim 6, wherein in the raw material mixing step, the average particle diameter of the fine particles is about in a range of 0.1 to 10 μm.

20. The method of manufacturing a filter according to claim 7, wherein in the raw material mixing step, the average particle diameter of the fine particles is about in a range of 0.1 to 10 μm.

21. The method of manufacturing a filter according to claim 6, wherein the reduction-resistant material includes one or more materials selected from the group consisting of aluminum oxide, mullite, yttrium oxide, magnesium oxide, lithium oxide, calcium oxide and titanium oxide.

22. The method of manufacturing a filter according to claim 7, wherein the reduction-resistant material includes one or more materials selected from the group consisting of aluminum oxide, mullite, yttrium oxide, magnesium oxide, lithium oxide, calcium oxide and titanium oxide.

23. An exhaust gas purification device for removing particulate materials contained in exhaust gas from an internal combustion engine, comprising:

a connecting pipe connected to the internal combustion engine and through which exhaust gas from the internal combustion engine flows; and a filter housing connected to the connecting pipe and accommodating a filter including ceramic particles as an aggregate and a ceramic particles protective material that is present on a surface of the ceramic particles and composed of a reduction-resistant material or a precursor thereof being reduced by carbon contained in the particulate materials at a higher temperature than a temperature at which an oxide of an element contained in the ceramic particles is reduced, wherein the reduction-resistant material or the precursor thereof is uniformly distributed throughout the body of the filter.

* * * * *